July 21, 1931. M. H. ACKERMAN 1,815,537
VALVE
Original Filed Aug. 2, 1928
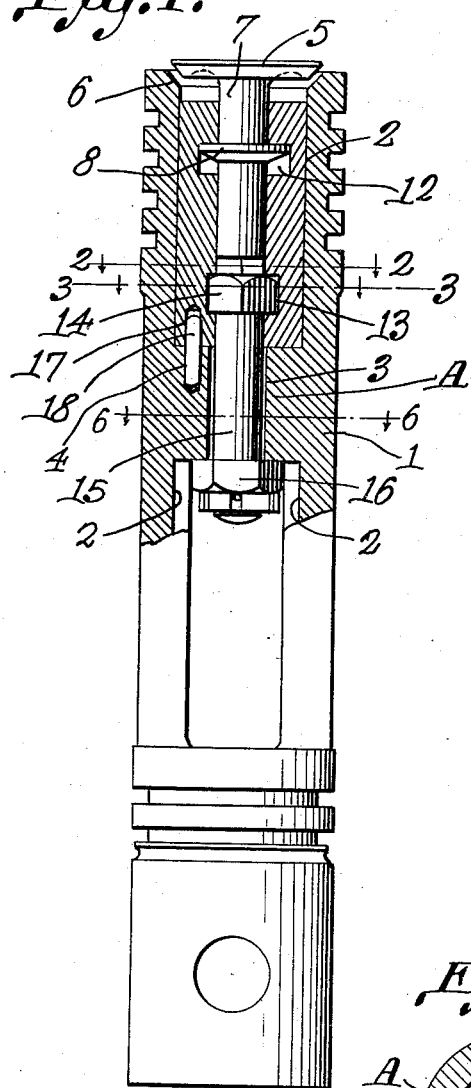
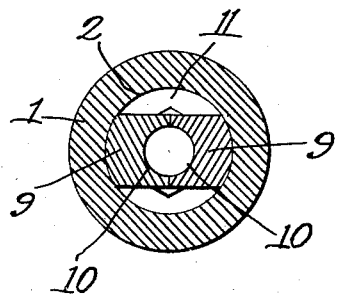
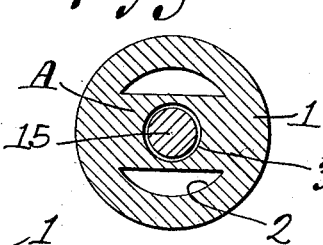
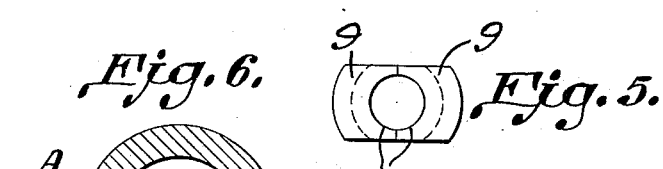
M. H. Ackerman
Inventor.
By C. A. Snow & Co.
Attorneys Patented July 21, 1931

1,815,537

UNITED STATES PATENT OFFICE

MICHAEL HENRY ACKERMAN, OF MANSFIELD, OHIO, ASSIGNOR OF ONE-HALF TO LOUIS C. SICKEL, OF CALEDONIA, OHIO

VALVE

Application filed August 2, 1928, Serial No. 297,055. Renewed May 28, 1931.

This invention relates to a valve designed primarily for use with the cylinder of a compressor although it can be employed advantageously in most places where a poppet valve is required.

One of the objects of the invention is to provide a poppet valve light enough for high speed operation and having no parts likely to become loose or detached because of the continual shock produced by the rapid opening and closing of the valve in a high speed mechanism.

Another object is to provide a poppet valve mechanism in which all the parts are interchangeable, can be heat treated to resist wear at high speeds, and have no threaded parts on the valve stem.

A further object is to provide a poppet valve of one moving part having substantial means for holding the valve assembled with its guide, it being unnecessary to utilize springs or dash pots to control the reciprocating parts.

Another object is to provide a structure of this character which can be operated at high speed and be used as a suction or discharge valve.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a view partly in elevation and partly in section showing a piston with the present improvements combined therewith.

Figure 2 is a section on line 2—2, Figure 1.

Figure 3 is a section on line 3—3, Figure 1, the bolt being shown in plan.

Figure 4 is a side elevation of the sectional guide.

Figure 5 is an end view thereof.

Figure 6 is a section on line 6—6, Figure 1.

Referring to the figures by characters of reference 1 designates a piston such as used, for example, in the compressor of a refrigerating apparatus. In the present structure this piston is formed with a main bore 2 opening through the piston as ordinarily. A narrow bridge A extends across the bore 2, acting as a seat and retainer for guides hereinafter described and this bridge has a small bore 3 which opens at both ends into the large or main bore 2. The sides of the bridge are spaced from the wall of bore 2 to provide passages for gas flowing from the lower to the upper portion of bore 2.

The valve includes a head 5 the peripheral portion of which is preferably tapered so as properly to engage the seat 6 provided therefor at the outer end of the larger or main bore 2. A stem 7 extends from the head and is hollow so as to render the valve very light. At a point between its ends the stem is formed with an annular collar 8.

For the purpose of holding the valve assembled with the piston there is provided a guide consisting of two opposed blocks 9 which are duplicates. The meeting faces of the blocks are channeled as at 10 to form a guide passage for the reception of the stem 7 and the side faces of the blocks are flat so as to leave segmental clearances 11 between the guide and the wall of the bore 2 which act as gas ports. These clearances open into the gas spaces at the side of the bridge A, and the the bridge constitutes a support for the guide.

The blocks constituting the guide are held properly centered within the bore 2 by rounding those faces thereof which engage the wall of the bore, said blocks being so proportioned that, when assembled, they will fit snugly against diametrically opposed portions of the wall of the bore. The inner or channeled faces of the blocks 9 are formed with transverse grooves 12 near one end which intersect the channels 10 and form pockets for the reception of the collar 8. These pockets are so proportioned as to allow limited reciprocation of the valve and valve stem, such movement being sufficient to allow the head of the valve to rest firmly on its seat and to lift a sufficient distance from the seat to meet all working requirements.

Additional transverse grooves 13 are formed in the meeting faces of the blocks 9 near that end of the guide remote from the grooves 12 and these grooves 13, which intersect the channels 10, are adapted to receive the head 14 of a bolt 15 which extends through the bore 3 in bridge A. The threaded end of the bolt is exposed within the piston inwardly beyond the bore 3 and is adapted to be engaged by a nut 16 or the like. A recess 17 is formed in one of the blocks 9 and is adapted to receive a dowel 18 seated in the recess 4.

In assembling the valve with the piston 1, the head 14 of bolt 15 is placed in the grooves 13 and the collar 8 of the valve stem 7 is placed within the grooves 12. The blocks 9 are pressed together and a dowel pin 18 is placed in recess 17. The blocks, with the other parts assembled therewith, are inserted into the bore 2 and bolt 15 will enter the bore 3. The blocks 9 will rest on the bridge A and will be held securely thereto by tightening nut 16 on bolt 15. Dowel 18 will of course enter the recess 4 and thus prevent the guide consisting of the blocks 9 from rotating within the bore 2. The head of the valve will normally rest on its seat 6 but pressure upwardly through the piston and through the spaces 11 will readily lift the valve from its seat, this movement being limited by collar 8 coming against those walls of grooves 12 in the path thereof. On the compression stroke the valve will of course tightly engage its seat.

The nut 16 can be provided with any suitable locking means.

When it is desired to renew or replace any of the parts it is merely necessary to unscrew the nut and to pull on the valve head 5. This will cause all of the inserted parts to lift out of the piston.

Although this valve has been shown and described for use with the piston of a compressor it is to be understood that it can be used to advantage with other structures requiring the use of a durable and efficient valve of this type capable of withstanding rough usage.

What is claimed is:

1. The combination with a structure having a space therein leading to a valve seat, of opposed members detachably mounted within and partly filling said space, said members being held together by opposed portions of the wall of the structure, there being a clearance space between the wall of the structure and one of the members providing a passage extending longitudinally within the structure to the valve seat, a valve having a stem mounted for reciprocation between said members, means on the stem housed by and cooperating with the members for limiting the movement of the valve relative to the seat, and means held at one end between the members and engaging said structure for holding the members to the structure.

2. The combination with a structure having a main bore with a valve seat at one end and a second bore opening thereinto, of opposed guide members removably seated in the main bore providing clearance spaces at the sides thereof, a valve having a stem mounted for reciprocation between the guide members, cooperating means on the stem and guide members for limiting the movement of the valve relative to the seat, means held between the guide members and extending through the second bore for holding said member in the main bore.

3. The combination with a structure having a main bore with a valve seat at one end and a second bore opening into the main bore, of opposed guide members removably seated in the main bore providing a clearance space in the main bore, a valve having a stem mounted for reciprocation between the guide members, cooperating means on the stem and guide members for limiting the movement of the valve relative to the seat, means held between the guide members and extending through the second bore for holding said member in the main bore, said guide members, valve stem and holding means being held assembled by opposed portions of the wall of the main bore.

4. The combination with a structure having a main bore with a valve seat at one end and a bridge across said bore having a bore therein opening into the main bore, of opposed guide members removably seated in the main bore providing a clearance space, a valve having a stem mounted for reciprocation between the guide members, cooperating means on the stem and guide members for limiting the movement of the valve relative to the seat, means held between the guide members and extending through the bore in the bridge for holding said member in the main bore, and means for holding the guide members against rotation in the main bore.

5. The combination with a structure having a bore with a valve seat at one end, of opposed guide members removably seated in the bore having registering channels intersected by opposing grooves, there being a clearance space between the guide members and the wall of the bore, a valve having a stem slidable within the channels, a collar on the stem projecting into the grooves for limiting reciprocation of the valve, and means held between the guide members and engaging the structure for securing said members to the structure, said means including a bolt having a head at one end and a nut at its other end, one of said ends engaging in grooves in the meeting faces of the guide members.

6. The combination with a structure having a bore and a bridge extending across the bore having a passage at one side, of opposed guide members removably seated in the bore and abutting against the bridge, there being a clearance between the guide and wall of the bore for the flow of gas from the passage by the bridge, registering channels in the guide members having grooves, a valve having a stem slidable within the channels, a collar on the stem projecting into the grooves for limiting reciprocation of the valve, and means held between the guide members and engaging the bridge for securing said members to the structure, said means including a bolt having a head at one end and a nut at its other end, one of said ends engaging in grooves in the meeting faces of the guide members.

7. The combination with a structure having a main bore with a valve seat at one end and a second bore coaxial therewith and opening thereinto, of opposed guide members removably seated in the main bore, a valve having a stem mounted for reciprocation between the guide members, means on the stem housed within and cooperating with the guide members for limiting the movement of the valve relative to the seat, and means gripped between the guide members and extending through the second bore for holding said members in the main bore.

In testimony that I claim the foregoing as my own, I have hereto affixed my signature.

MICHAEL HENRY ACKERMAN.